United States Patent
Cha et al.

(10) Patent No.: US 11,196,946 B1
(45) Date of Patent: Dec. 7, 2021

(54) SMART BINNING CIRCUIT, IMAGE SENSING DEVICE AND OPERATION METHOD OF THE SAME

(71) Applicant: SK hynix Inc., Gyeonggi-do (KR)

(72) Inventors: Su Ram Cha, Gyeonggi-do (KR); Dong Ik Kim, Gyeonggi-do (KR); Tae Hyun Kim, Gyeonggi-do (KR); Seong Hee Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/140,445

(22) Filed: Jan. 4, 2021

(30) Foreign Application Priority Data

Jun. 5, 2020 (KR) .................. 10-2020-0068297

(51) Int. Cl.
*H04N 5/335* (2011.01)
*H04N 5/347* (2011.01)
*H04N 5/351* (2011.01)

(52) U.S. Cl.
CPC ............ *H04N 5/347* (2013.01); *H04N 5/351* (2013.01)

(58) Field of Classification Search
CPC ..................................... H04N 5/351
See application file for complete search history.

(56) References Cited

U.S. PATENT DOCUMENTS

| 3,971,065 A | 7/1976 | Bayer |
| 8,767,101 B2 * | 7/2014 | Kim ............... G06T 3/4015 348/252 |
| 10,469,735 B2 | 11/2019 | Shabtay et al. |
| 2014/0253808 A1 | 9/2014 | Tachi |

FOREIGN PATENT DOCUMENTS

| KR | 10-0565429 | 3/2006 |
| KR | 10-2016-0031706 | 3/2016 |

* cited by examiner

*Primary Examiner* — Gary C Vieaux
(74) *Attorney, Agent, or Firm* — IP & T Group LLP

(57) ABSTRACT

A smart binning circuit includes an edge information generator suitable for generating edge information from pixel data outputted from a pixel array; a weight allocator suitable for allocating a weight based on the edge information; a binning component suitable for generating a binning value by performing an edge detection interpolation (EDI) binning on the edge information; a bayer binning component suitable for generating an average value representing pixels that are down-scaled through a 4-sum binning operation; and a combiner suitable for combining the binning value and the average value according to the allocated weight.

21 Claims, 10 Drawing Sheets

FIG. 5

| G11 | R12 | G13 | R14 | G15 | R16 |
|-----|-----|-----|-----|-----|-----|
| B21 | G22 | B23 | G24 | B25 | G26 |
| G31 | R32 | G33 | R34 | G35 | R36 |
| B41 | G42 | B43 | G44 | B45 | G46 |
| G51 | R52 | G53 | R54 | G55 | R56 |
| B61 | G62 | B63 | G64 | B65 | G66 |

FIG. 7

| VERTICAL DIRECTION | | |
|---|---|---|
| 1 | 1 | 1 |
| 0 | 0 | 0 |
| -1 | -1 | -1 |

| HORIZONTAL DIRECTION | | |
|---|---|---|
| 1 | 0 | -1 |
| 1 | 0 | -1 |
| 1 | 0 | -1 |

SMART BINNING CIRCUIT, IMAGE SENSING DEVICE AND OPERATION METHOD OF THE SAME

CROSS-REFERENCE TO RELATED APPLICATION

This patent application claims priority under 35 U.S.C. § 119 on Korean Patent Application No. 10-2020-0068297, filed on Jun. 5, 2020, which is herein incorporated by reference in its entirety.

TECHNICAL FIELD

Various embodiments of the present invention generally relate to a semiconductor device. Particularly, various embodiments relate to a smart binning circuit, an image sensing device and an operation method of the same.

BACKGROUND

Recently, the computer environment paradigm has shifted to ubiquitous computing, which enables a computer system to be used virtually anytime and everywhere. As a result, use of portable electronic devices such as mobile phones, digital cameras, notebook computers and the like has been rapidly increasing.

Recently, due to the rapid development of display devices, the development of image photographing devices having image sensors, such as cameras and camcorders, has accelerated. An image photographing device can photograph an image and record the photographed image in a recording medium, and simultaneously reproduce the image at any time. Accordingly, as use of image photographing devices has increased, the demand for more functionality in the image photographing device has also increased. Specifically, in addition to compact size, reduced weight, and lower power consumption, an image photographing device with higher capability functionality as well as multi-functions is desirable.

SUMMARY

Embodiments of the present invention are directed to a smart binning circuit, an image sensing device and an operation method of the same, capable of improving resolution by performing a smart binning operation. In the smart binning operation, a binning value is generated by performing an edge detection interpolation (EDI) binning based on edge information, an average value representing pixels that are down-scaled through a 4-sum binning operation is generated, and the binning value and the average value are combined and outputted.

Also, embodiments of the present invention may reduce resolution deterioration by outputting image data directly without performing the smart binning operation when illumination is high, and may reduce noise by outputting image data through the smart binning operation when illumination is low.

In an embodiment, a smart binning circuit may include an edge information generator suitable for generating edge information from pixel data outputted from a pixel array; a weight allocator suitable for allocating a weight based on the edge information; a binning component suitable for generating a binning value by performing an edge detection interpolation (EDI) binning on the edge information; a bayer binning component suitable for generating an average value representing pixels that are down-scaled through a 4-sum binning operation; and a combiner suitable for combining the binning value and the average value according to the allocated weight.

The binning component may include an interpolation block suitable for performing an interpolation to estimate a plane having a same color based on the edge information; and a binning block suitable for performing the EDI binning on the pixel data interpolated by the interpolation block.

The interpolation block may estimate a red color pixel and a blue color pixel as a green color pixel using a horizontal direction filter, a vertical direction filter or horizontal/vertical direction filter based on the edge information generated from the interpolation block.

The interpolation block may use the horizontal filter when an edge direction of the plurality of pixels as indicated by the edge information is the horizontal direction, use the vertical filter when the edge direction of the plurality of pixels is the vertical direction, and use the horizontal/vertical direction filter when the edge direction of the plurality of pixels is a diagonal direction.

The combiner may allocate the weight to one of the binning value and the average value, combine the binning value and the average value, and output combined value.

The combiner may allocate the weight to the binning value when a strength of the edge information is greater than a set value, and allocate the weight to the average value when the strength of the edge information is less than the set value.

The weight allocator may calculate a lean value using the horizontal direction filter and the vertical direction filter, and a single weight per 2×2 pixel based on the lean value.

In another embodiment, an image sensing device may include an image sensor including a pixel array having a plurality of pixels; an image signal processor suitable for processing an output signal of the image sensor; and a smart binning circuit, wherein the smart binning circuit comprises an edge information generator suitable for generating edge information from pixel data, which are outputted from a pixel array; a weight allocator suitable for allocating a weight based on the edge information; a binning component suitable for generating a binning value by performing an edge detection interpolation (EDI) binning on the edge information; a bayer binning component suitable for generating an average value representing pixels that are down-scaled through a 4-sum binning operation; and a combiner suitable for combining the binning value and the average value according to the allocated weight.

The binning component may include an interpolation block suitable for performing an interpolation to estimate a plane having a same color based on the edge information; and a binning block suitable for performing the EDI binning on the pixel data interpolated by the interpolation block.

The interpolation block may estimate a red color pixel and a blue color pixel as a green color pixel using a horizontal direction filter, a vertical direction filter and horizontal/vertical direction filter based on the edge information generated from the interpolation block.

The combiner may allocate differently the weight to the binning value and the average value, combine the binning value and the average value that the weight is differently allocated, and output combined value.

The combiner may allocate the weight to the binning value when a strength of the edge information is greater than a set value, and allocate the weight to the average value when the strength of the edge information is less than the set value.

The weight allocator may calculate a lean value using the horizontal direction filter and the vertical direction filter, and a single weight per 2×2 pixel based on the lean value.

In another embodiment, an image sensing device may include an image sensor including a pixel array having a plurality of pixels; an image signal processor suitable for processing an output signal of the image sensor; and a smart binning circuit, wherein the smart binning circuit comprises a smart binning component suitable for performing a first binning operation on edge information generated from pixel data outputted from a pixel array and outputting first pixel information; a bayer binning component suitable for outputting second pixel information by performing a second binning operation on a bayer format data converted from the plurality of pixel data; an illumination information generator suitable for generating illumination information indicating low illumination less than a preset value or high illumination greater than the preset value; and a pixel information selector suitable for selectively outputting the first pixel information and the second pixel information according to the illumination information.

The pixel information selector may output the first pixel information when the illumination information indicates low illumination, and output the second pixel information when the illumination information indicates high illumination.

The first binning operation may include an operation for performing an edge detection interpolation (EDI) binning operation on the edge information, and the second binning operation may include an operation for generating an average value representing pixels that are down-scaled through a 4-sum binning operation.

The smart binning component comprises an edge information generator suitable for generating the edge information from the plurality of pixel data, which are outputted from the pixel array; a weight allocator suitable for allocating the weight based on the edge information generated from the edge information generator; a binning component suitable for generating the binning value by performing the EDI binning operation on the edge information generated from the edge information generator; a bayer binning component suitable for generating an average value representing pixels that are down-scaled through a 4-sum binning operation; and a binning component suitable for generating the binning value by performing the EDI binning operation on the edge information according to the weight allocated by the weight allocator.

In another embodiment, an operation method of an image sensing device may include outputting first pixel information by performing a first binning operation according to edge information generated from pixel data, which are outputted from a pixel array; outputting second pixel information by performing a second binning operation on bayer format data converted from the plurality of pixel data; generating illumination information indicating high illumination information or low illumination with reference to a set value according to surrounding illumination condition; and selectively outputting the first pixel information and the second pixel information based on the illumination information.

The first binning operation may include an operation for performing an edge detection interpolation (EDI) binning operation on the edge information, and the second binning operation may include an operation for generating an average value representing pixels that are down-scaled through a 4-sum binning operation, and wherein the first pixel information is outputted when the illumination information indicates low illumination, and the second pixel information is outputted when the illumination information indicates high illumination.

The outputting of the first pixel information may include generating the edge information from the plurality of pixel data; allocating the weight based on the edge information; and generating the binning value by performing the EDI binning operation on the edge information according to the weight.

In another embodiment, an image sensing device may include an image sensor including a plurality of pixels and outputting pixel data; and a binning circuit comprises: an edge information generator suitable for generating edge information from the pixel data; an interpolation binning component suitable for generating first binning information by performing an edge detection interpolation (EDI) binning on the edge information; a bayer binning component suitable for generating second binning information by performing a set down-scale binning on the pixel data; and a combiner suitable for receiving the first and second binning information, allocating different weights to the first and second binning information based on strength of the edge information to generate third and fourth binning information, respectively, combining the third and fourth binning information and outputting the combined binning information.

These and other features and advantages of the present invention will become understood by those with ordinary skill in the art of the present invention from the following drawings and detailed description.

BRIEF DESCRIPTION OF THE DRAWINGS

The description herein makes reference to the accompanying drawings wherein like reference numerals refer to like parts throughout the several views.

FIG. 5 is a diagram illustrating an average binning operation of a bayer binning component, such as that shown in FIG. 3.

FIG. 7 is a diagram illustrating an example of a filter used for a calculation operation of a weight allocator, such as that shown in FIG. 3.

DETAILED DESCRIPTION

Figure 1:
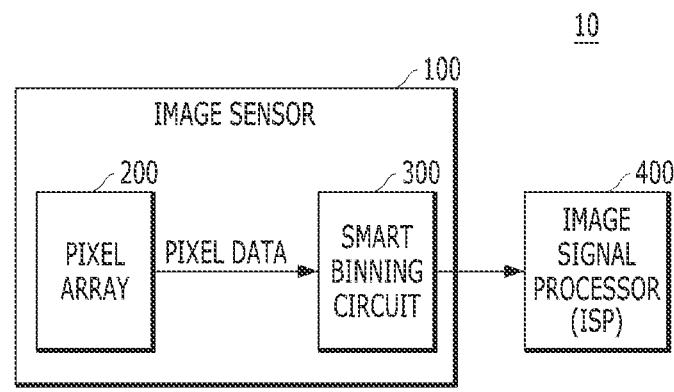
FIG. 1 is a block diagram illustrating an image sensing device employing a smart binning circuit in accordance with an embodiment of the present invention.

Various examples of the present invention are described below in more detail with reference to the accompanying drawings. The invention may be realized in other embodiments, forms and variations thereof and should not be construed as being limited to the embodiments set forth herein. Rather, the described embodiments are provided so that this present invention is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present invention are described in detail with reference to the accompanied drawings.

FIG. 1 is a block diagram illustrating an image sensing device in accordance with an embodiment of the present invention.

Referring to FIG. 1, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, as an object in an internet of things (IoT) network, or as an object in an internet of everything (IoE) network.

The image sensor 100 may include a pixel array 200 and a smart binning circuit 300.

The pixel array 200 may include a plurality of pixels. Herein, each pixel may represent pixel data, and have an RGB data format, YUV data format, YCbCr data format, or any other data format consistent with the teachings herein.

The smart binning circuit 300 may generate edge information based on pixel data outputted from the pixel array 200 having a plurality of pixels. Further, the smart binning circuit 300 may generate a binning value by performing an edge detection interpolation (EDI) operation based on the edge information. Further, the smart binning circuit 300 may generate an average value which represents the plurality of pixels that are down-scaled through a binning operation (e.g., a 4-sum binning operation). Furthermore, the smart binning circuit 300 may combine the binning value and the average value based on a weight allocated according to the edge information.

The smart binning circuit 300 may be implemented as shown in FIGS. 3 to 9.

The detailed configuration and operations of the smart binning circuit 300 are described in detail with reference to FIGS. 3 to 9.

The image signal processor 400 may be implemented in an integrated circuit, a system on chip (SoC) or a mobile application processor. The image signal processor 400 may process an output signal of the image sensor 100. That is, the image signal processor 400 may receive and process an image output signal outputted from the smart binning circuit 300 of the image sensor 100.

More specifically, the image signal processor 400 may generate RGB image data from a Bayer pattern corresponding to pixel data. For example, the image signal processor 400 may process a Bayer pattern such that the image data is displayed in a display, and may transfer processed image data to an interface for transfer to another component or device.

In an embodiment, each of the image sensor 100 and the image signal processor 400 may be implemented as a multi-chip package (MCP). In another embodiment, the image sensor 100 and the image signal processor 400 may be implemented as a single chip.

Figure 2:
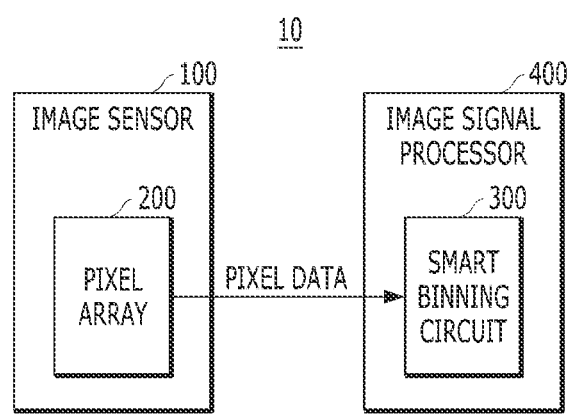
FIG. 2 is a block diagram illustrating an image sensing device employing a smart binning circuit in accordance with another embodiment of the present invention.

FIG. 2 is a block diagram illustrating an image sensing device in accordance with an embodiment of the present invention.

Referring to FIG. 2, the image sensing device 10 may include an image sensor 100 and an image signal processor (ISP) 400. The image signal processor 400 may include a smart binning circuit 300.

The smart binning circuit 300 may be implemented as shown in FIGS. 3 to 9.

The structure and operation of the image sensing device 10 shown in FIG. 2 are substantially the same as the structure and operation of the image sensing device 10 shown in FIG. 1, except that the smart binning circuit 300 is implemented in the image signal processor 400 instead of in the image sensor 100. Thus, detailed description of the image sensor device 10 of FIG. 2 is omitted.

Hereinafter, the smart binning circuit 300 is described with reference to FIGS. 3 to 7.

Figure 3:
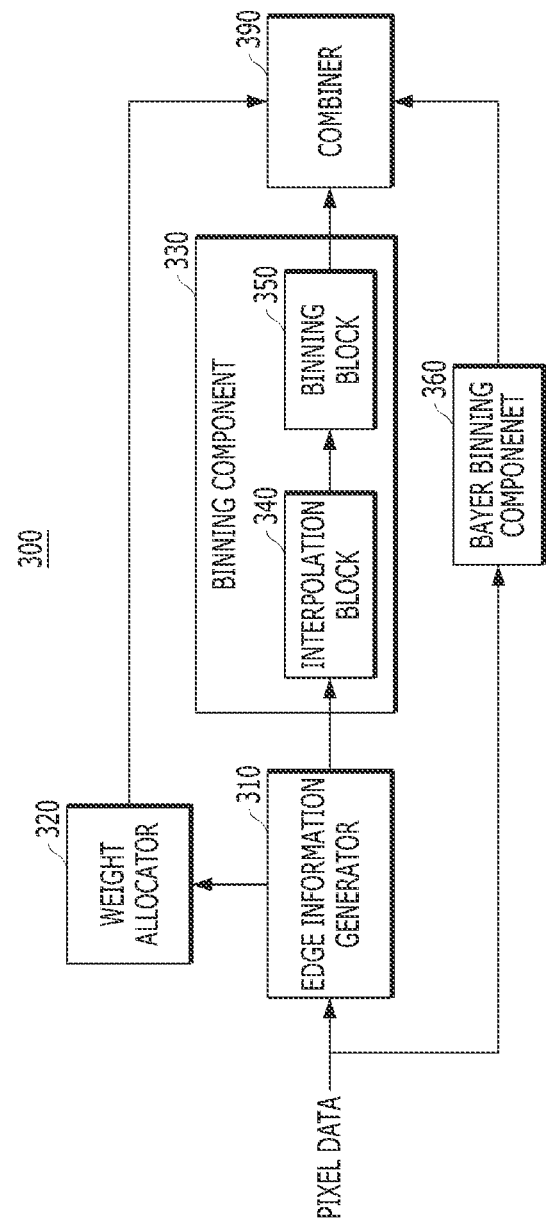
FIG. 3 is a block diagram illustrating a smart binning circuit in accordance with an embodiment of the present invention.
Figure 4:
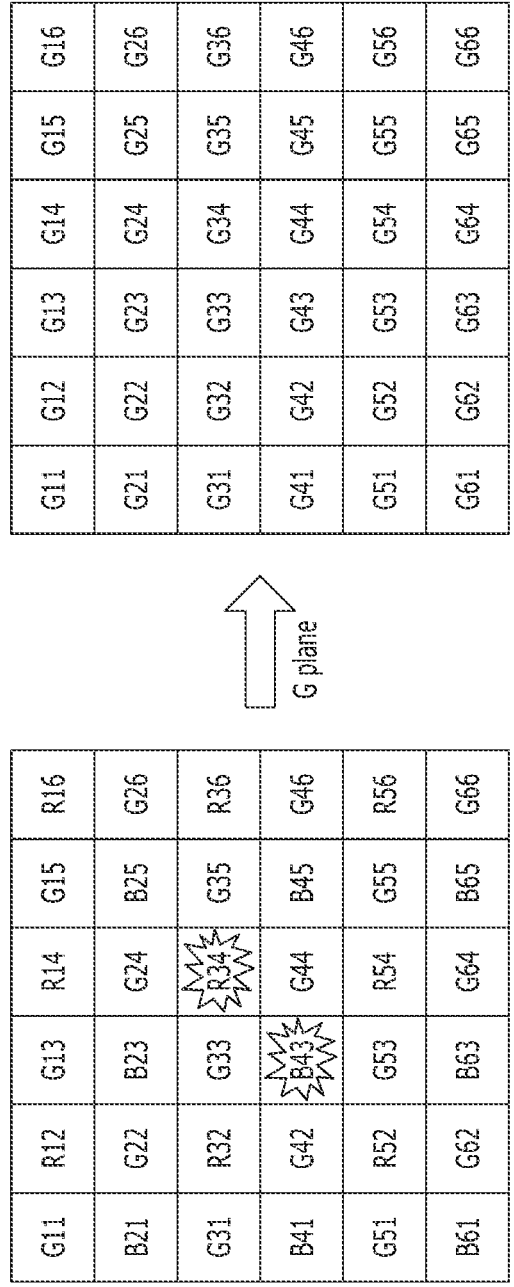
FIG. 4 is a diagram illustrating a G plane estimation of a binning component, such as that shown in FIG. 3.
Figure 6:
FIG. 6 is a diagram illustrating a calculation operation of a weight allocator, such as that shown in FIG. 3.

FIG. 3 is a block diagram illustrating a smart binning circuit in accordance with an embodiment of the present invention. FIG. 4 is a diagram illustrating a G plane estimation of a binning component shown in FIG. 3. FIG. 5 is a diagram illustrating an average binning operation of a bayer binning component shown in FIG. 3. FIG. 6 is a diagram illustrating a calculation operation of a weight allocator shown in FIG. 3. FIG. 7 is a diagram illustrating an example of a filter used for a calculation operation of a weight allocator shown in FIG. 3.

Referring to FIGS. 3 to 7, the smart binning circuit 300 may include an edge information generator 310, a weight allocator 320, a binning component 330, a bayer binning component 360 and a combiner 390.

The edge information generator 310 may detect and generate edge information from pixel data outputted from a pixel array (e.g., an n×n block of pixels, where n is an integer of 2 or greater).

The binning component 330 may generate a binning value by performing an edge detection interpolation (EDI) binning operation based on the edge information generated by the edge information generator 310. The EDI binning operation includes performing binning based on the pixel data, which are interpolated in a plane based on the edge information.

The binning component 330 may include an interpolation block 340 and a binning block 350.

FIG. 4 shows a 6×6 pixel array, which is used to explain aspects of the present invention.

The interpolation block 340 may perform an interpolation based on the edge information to estimate a green G plane.

In FIG. 4, green pixels G11, G13, G15, G22, G24, G26, G31, G33, G35, G42, G44, G46, G51, G53, G55, G62, G64 and G66 may be maintained. Red pixels R12, R14, R16, R32, R34, R36, R52, R54, R56 may be estimated and converted to green pixels G12, G14, G16, G32, G34, G36, G52, G54 and G56, respectively. Blue pixels B21, B23, B25, B41, B43, B45, B61, B63 and B65 may be estimated and converted to green pixels G21, G23, G25, G41, G43, G45, G61, G63 and G65, respectively.

In an embodiment, the interpolation block 340 may perform green color estimation through a horizontal direction filter, a vertical direction filter or a horizontal/vertical direction filter based on the edge information. The edge information represents information on the pixels on the boundary of the pre-interpolated pixel array.

If an edge direction as indicated by the edge information is a horizontal direction in the red pixel R34, the red pixel R34 is estimated and converted to the green pixel G34 according to the equation 'G34=(G33+G35)/2' using the horizontal filter.

If the edge direction is a vertical direction in the red pixel R34, the red pixel R34 is estimated and converted to the green pixel G34 according to the equation 'G34=(G24+G44)/2' using the vertical filter.

If the edge direction is a diagonal direction in the red pixel R34, the red pixel R34 is estimated and converted to the green pixel G34 according to the equation 'G34=(G33+G35+G24+G44)/4' using the horizontal/vertical filter.

The binning block 350 may generate the binning value by performing a binning operation based on the pixel data in the green plane, which are interpolated from the interpolation block 340.

That is, four pixels forming a 2×2 pixel array may be down-scaled to one pixel.

For example, the green pixel G34 may be down-scaled according to the equation '(G33+G34+G43+G44)/4'. That is, the binning operation may be performed by generating the binning value, which is the average value of the green pixels G33 and G44 and the interpolated green pixels G34 and G43.

Herein, the 6×6 pixel array shown in FIG. 4 may be down-scaled to a 3×3 pixel array.

The weight allocator 320 may differently allocate a weight according to the edge strength of the texture generated by the edge information generator 310.

Referring to FIGS. 5 and 6, the weight allocator 320 may calculate a lean value using the horizontal direction filter and the vertical direction filter and calculate one weight per 2×2 pixel array based on the lean value.

For example, an average value Y00_bin of pixels G11, R12, B21 and G22 in the 2×2 pixel array may be calculated by equation 1.

$$Y00\_bin = (G11 + R12 + B21 + G22)/4 \qquad \text{[equation 1]}$$

This calculation may be performed for each of the nine 2×2 pixel arrays that collectively form the 6×6 pixel array shown in FIG. 5 to generate nine average (bin) values.

Subsequently, as shown in FIG. 6, a lean value of the nine average values may be calculated using the horizontal direction filter and the vertical direction filter. The weight value acquired may be from 0 to 16 based on the lean value.

In an embodiment of the present invention, a 'Prewitt' function is used as the horizontal direction filter and the vertical direction filter. But in another embodiment of the present invention, a 'Sobel' function, a 'Roberts' function and/or other suitable function(s) may be used.

The detailed operation for acquiring the weight value is omitted because such operation is understood by those skilled in the art.

The bayer binning component 360 may generate an average value which represents the plurality of pixels that are down-scaled through a 4-sum binning operation on the plane having same color pixels. In an embodiment of the present invention, the 4-sum binning operation may be performed on the pixel data of a bayer pattern.

The average component values of the green pixels G33 and G44, the red pixel R34 and the blue pixel B34 in the 2×2 pixel array located in a center of the 6×6 pixel array may be calculated according to equation 2. That is, the green component value ($G_{OUT}$) may be calculated as an average of the green pixel G33 in the 2×2 pixel array and adjacent green pixels G35, G53 and G55. Each of the red and blue component values ($R_{OUT}$) and ($B_{OUT}$), respectively, may be calculated in the same way according to equation 2.

$$G_{OUT}=(G33+G35+G53+G55)/4,$$

$$R_{OUT}=(R34+R36+R54+R56)/4,$$

$$B_{OUT}=(B43+B45+B63+B65)/4, \quad \text{[equation 2]}$$

The combiner 390 may combine the binning value generated by the binning component 330 and the average value generated by the bayer binning component 360 according to the weight allocated by the weight allocator 320, and output the combined value.

For example, the weight allocation of the combiner 390 may be performed according to equation 3.

$$\{(\text{weight}+\text{average})+(16-\text{weight})*\text{binning value}\}/16 \quad \text{[equation 3]}$$

Herein, if the edge strength as indicated by the edge information is greater than a set value, the weight is allocated to the binning value generated by the binning component 330. If the edge strength as indicated by the edge information is less than the set value, the weight is allocated to the average value generated by the bayer binning component 360.

Figure 8:
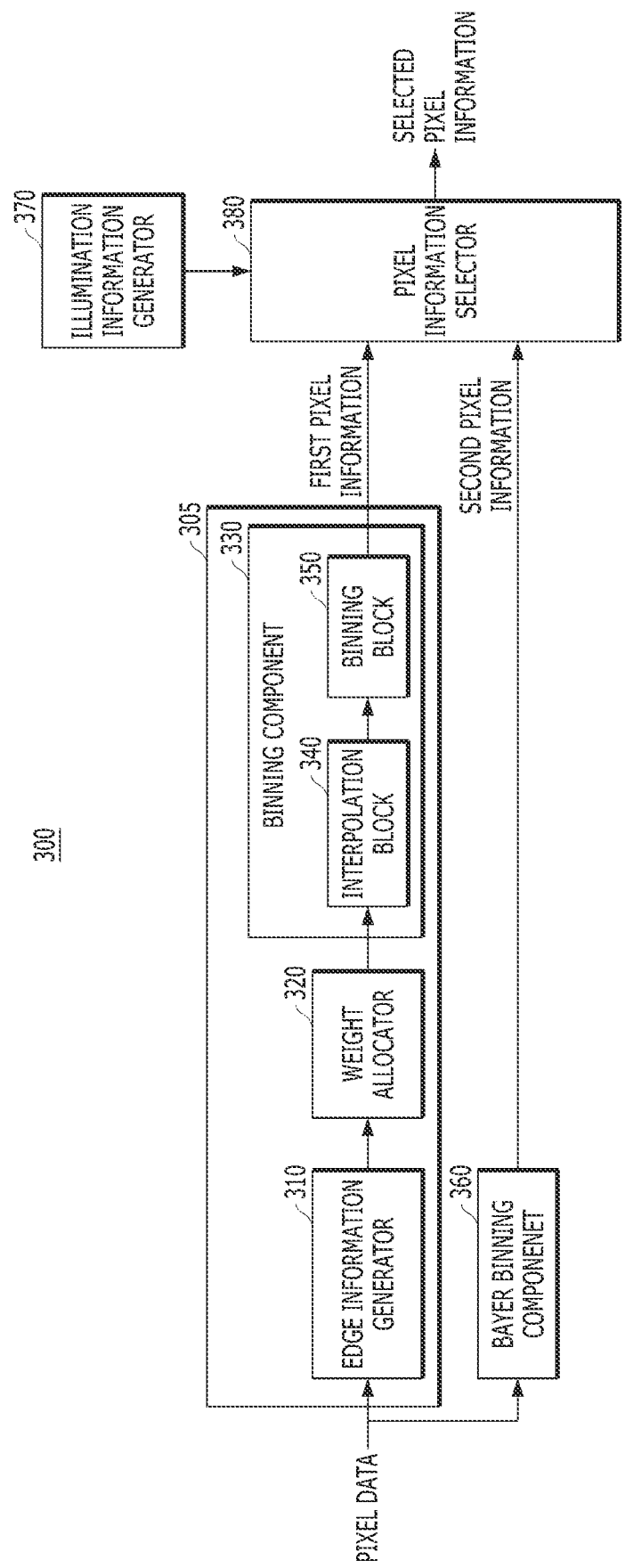
FIG. 8 is a block diagram illustrating a smart binning circuit in accordance with another embodiment of the present invention.

Hereinafter, the smart binning circuit 300, in accordance with another embodiment of the present invention, is described with reference to FIG. 8. FIG. 8 is a block diagram illustrating the smart binning circuit 300.

Referring to FIG. 8, the smart binning circuit 300 may include a smart binning component 305, a bayer binning component 360, an illumination information generator 370 and a pixel information selector 380.

The smart binning component 305 may perform a first binning operation based on edge information generated from pixel data outputted from a pixel array (e.g., pixel array 200 of FIG. 1 or 2) and output first pixel information.

Herein, the first binning operation includes performing an EDI binning based on the edge information.

The smart binning component 305 may include an edge information generator 310, a weight allocator 320 and a binning component 330.

The edge information generator 310 may generate the edge information from the plurality of pixel data outputted from the pixel array.

The weight allocator 320 may allocate the weight according to the edge information.

The binning component 330 may generate a binning value by performing the EDI binning operation based on the edge information generated by the edge information generator 310 according to the weight allocated by the weight allocator 320.

The binning component 330 may include an interpolation block 340 and a binning block 350.

The detailed configuration and operation of the edge information generator 310, the weight allocator 320 and the binning component 330 is omitted here because those components are the same as their counterparts illustrated in FIGS. 3 to 7.

The bayer binning component 360 may perform a second binning operation on the plurality pixel data and output second pixel information. In an embodiment, the second binning operation includes generating an average of the pixels that are down-scaled through a 4-sum binning operation.

The detailed operation of the bayer binning component 360 is omitted here because the bayer binning component 360 of FIG. 8 is the same as that illustrated in FIGS. 3 to 7.

The illumination information generator 370 may generate illumination information indicating low illumination less than a preset value or high illumination greater than the preset value according to a surrounding illumination condition. Low illumination indicates that the surrounding illumination condition is low illumination. High illumination indicates that the surrounding illumination condition is high illumination.

The pixel information selector 380 may selectively output the first pixel information outputted from the smart binning component 305 and the second pixel information outputted from the bayer binning component 360 according to the illumination information generated by the illumination information generator 370.

The pixel information selector 380 may output the first pixel information when the low illumination information is provided from the illumination information generator 370. The pixel information selector 380 may output the second pixel information when the high illumination information is provided from the illumination information generator 370.

Figure 9:
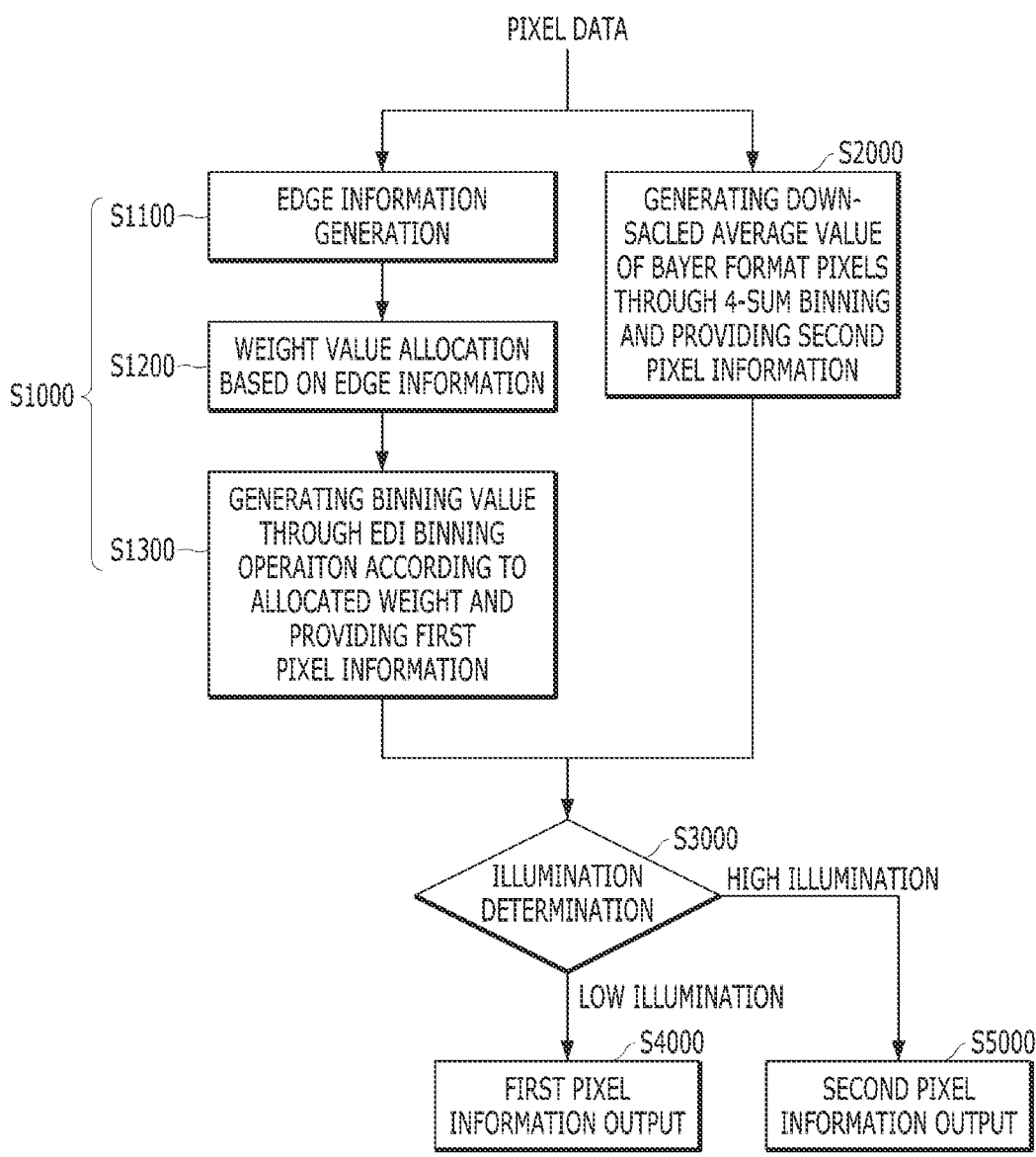
FIG. 9 is a flow chart illustrating an operation of an image sensing device in accordance with another embodiment of the present invention.

Hereinafter, an operation of an image sensing device in accordance with an embodiment of the present invention is described with reference to FIG. 9. FIG. 9 is a flow chart illustrating an operation of an image sensing device (e.g., image sensing device 10 in FIGS. 1 and 2) in accordance with an embodiment of the present invention.

Referring to FIG. 9, the operation of an image sensing device may include first pixel information providing operation S1000, a second pixel information providing operation S2000, an illumination information determination operation S3000 and selective output operations S4000 and S5000.

At operation S1000, the pixel information may be provided by performing the first binning operation according to the edge information generated from pixel data outputted from a pixel array. The first binning operation includes performing the EDI binning based on the edge information.

Operation S1000 may include an edge information generation operation S1100, a weight allocation operation S1200 and a binning value generation operation S1300.

At operation S1100, the edge information may be generated from the plurality of pixel data outputted from the pixel array.

At operation S1200, the weight may be calculated and allocated according to the edge information.

In an embodiment, a lean value may be calculated using the horizontal direction filter and the vertical direction filter. One weight per 2×2 pixel array may be calculated based on the lean value. The weight may range from "0" to "16".

The detailed calculation of the weight is the same as described in FIGS. 5 and 6.

At operation S1300, the EDI binning operation may be performed based on the edge information. The interpolation operation may be performed to estimate the same color plane based on the edge information, and the binning value may be generated by performing the binning operation based on the interpolated pixel data.

In an embodiment, a green color estimation may be performed through the horizontal direction filter, the vertical direction filter or the horizontal/vertical direction filter along a direction that does not go against a texture based on the edge information.

Referring back to FIG. 4, if an edge direction is a horizontal direction in the red pixel R34, the red pixel R34 is estimated and converted to the green pixel G34 according to the equation 'G34=(G33+G35)/2' using the horizontal filter.

If the edge direction is a vertical direction in the red pixel R34, the red pixel R34 is estimated and converted to the green pixel G34 according to the equation 'G34=(G24+G44)/2' using the vertical filter.

If the edge direction is a diagonal direction in the red pixel R34, the red pixel R34 is estimated and converted to the green pixel G34 according to the equation 'G34=(G33+G35+G24+G44)/4' using the horizontal/vertical filter.

At operation S2000, the second pixel information may be generated by performing the second binning operation based on a bayer format data converted from the plurality of pixel data. The second binning operation includes generating an average representing the pixels that are down-scaled through a 4-sum binning operation.

At operation S3000, high illumination information or low illumination information may be generated with reference to a set value according to a surrounding illumination condition.

The low illumination indicates that the surrounding illumination condition is low illumination. The high illumination indicates that the surrounding illumination condition is high illumination.

At operations S4000 and S5000, the first pixel information and the second pixel information are selectively outputted according to the illumination information.

The first pixel information may be outputted when the low illumination information is provided at operation S4000, whereas the second pixel information may be outputted when the high illumination information is provided at operation S5000.

Hereinafter, a system configured to implement an image sensing device in accordance with an embodiment of the present invention is described in detail with reference to FIG. 10.

Figure 10:
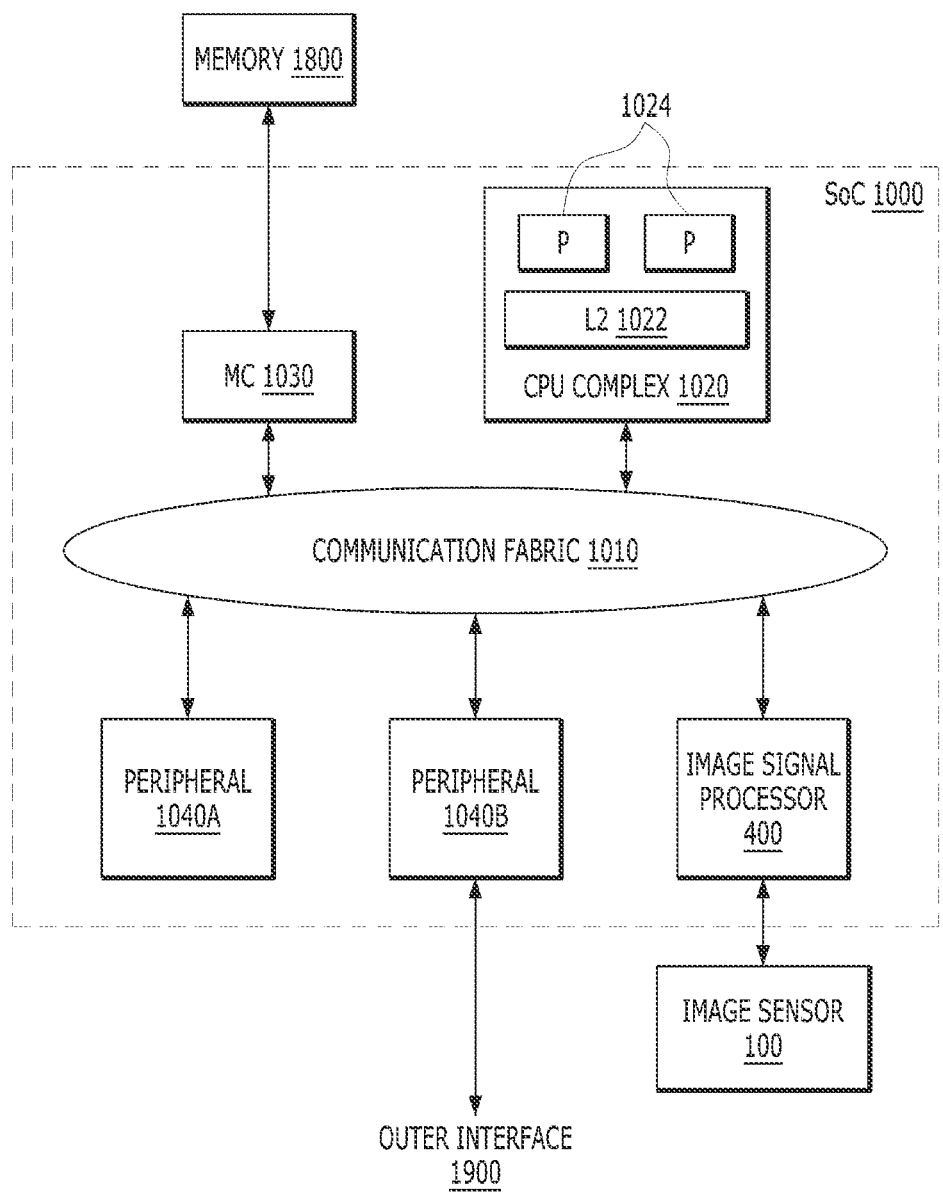
FIG. 10 is a block diagram illustrating a system configured to implement an image sensing device in accordance with an embodiment of the present invention.

FIG. 10 illustrates a system configured to implement an image sensing device in accordance with an embodiment of the present invention.

In various embodiments, the system of FIG. 10 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to an embodiment, the system of FIG. 10 may represent a system-on-a-chip (SoC). The circuits of the SoC 1000 may be integrated onto a single semiconductor substrate as an integrated circuit, i.e., a "chip." In some embodiments, the circuits may be implemented on two or more discrete chips in a system. The SoC 1000 will be used as an example herein.

In the illustrated embodiment, the circuits of the SoC 1000 include a central processing unit (CPU) complex 1020, on-chip peripheral circuits 1040A-1040B (individually, "peripheral" and collectively "peripherals"), a memory controller (MC) 1030, a communication fabric 1010, and an image signal processor 400. The SoC 1000 may also be coupled to additional circuits, such as to a memory 1800 and an image sensor 100. The circuits 1020, 1030, 1040A-1040B, and 400 may all be coupled to the communication fabric 1010. The memory controller 1030 may be coupled to the memory 1800, and the peripheral 1040B may be coupled to an outer interface 1900. Additionally, the image signal processor 400 may be coupled to the image sensor 100.

The peripherals 1040A-1040B may be any set of additional hardware functionality in the SoC 1000. For example, the peripherals 1040A-1040B may include display controllers configured to display video data on one or more display devices, graphics processing units (GPUs), video encoder/decoders, scalers, rotators, blenders, etc.

The image signal processor 400 may, in some embodiments, be part of another video peripheral configured to process image capture data from the image sensor 100 (or other image sensor). The image signal processor 400 and the image sensor 100 may be configured to implement the image signal processor 400 and the image sensor 100 shown in FIGS. 1 to 9.

The peripherals 1040A-1040B may also include audio peripherals such as microphones, speakers, interfaces to microphones and speakers, audio processors, digital signal processors, mixers, etc. The peripherals 1040A-1040B (e.g., the peripheral 1040B) may include peripheral interface controllers for various interfaces 1900 external to the SoC 1000 including interfaces such as Universal Serial Bus (USB), peripheral circuit interconnect (PCI) including PCI Express (PCIe), serial and parallel ports, etc. The peripherals 1040A-1040B may further include networking peripherals such as media access controllers (MACs). In general, any set of hardware may be included, according to various embodiments.

The CPU complex 1020 may include one or more processors (Ps) 1024 that serve as the CPU of the SoC 1000. The processor(s) 1024 may execute the main control software of the system, such as an operating system. Generally, software executed by the CPU may control the other circuits of the system to realize the desired functionality of the system. The processors 1024 may also execute other software, such as application programs. The application programs may provide user functionality and may rely on the operating system for lower level device control. Accordingly, the processors 1024 may also be referred to as application processors. The CPU complex 1020 may further include other hardware such as the L2 cache 1022 and/or an interface to the other circuits of the system (e.g., an interface to the communication fabric 1010).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other circuits as a system on a chip (SoC 1000) or other levels of integration. Processors may further encompass discrete microprocessors, processor cores and/or microprocessors integrated into multichip module implementations, processors implemented as multiple integrated circuits, etc.

The memory controller 1030 may generally include circuitry for receiving memory operations from other circuits of the SoC 1000 and for accessing the memory 1800 to complete the memory operations. The memory controller 1030 may be configured to access any type of memory 1800. For example, the memory 1800 may be a static random access memory (SRAM), or a dynamic RAM (DRAM) such as synchronous DRAM (SDRAM) including double data rate (DDR, DDR2, DDR3, etc.) DRAM. Low power/mobile versions of the DDR DRAM may be supported (e.g., LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SoC implementations, for example, the memory cache may reduce power consumption in the SoC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain circuits. Additionally, in some embodiments, a system cache may be located externally to the memory controller 1030.

In an embodiment, the memory 1800 may be packaged with the SoC 1000 in a chip-on-chip or package-on-package configuration.

A multichip module configuration of the SoC 1000 and the memory 1800 may be used as well. Such configurations may be relatively more secure (in terms of data observability) than transmissions to other circuits in the system (e.g., to the end points). Accordingly, protected data may reside in the memory 1800 unencrypted, whereas the protected data may be encrypted for exchange between the SoC 1000 and external endpoints.

The communication fabric 1010 may be any communication interconnect and protocol for communicating among the circuits of the SoC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of circuits of the SoC 1000 (and the number of subcircuits within the CPU complex 1020) may vary in different embodiments. There may be more or fewer of each circuit/subcircuit than the number shown in FIG. 6.

In some embodiments, the methods described herein may be implemented by a computer program product, or software. In some embodiments, a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

As described above, a smart binning circuit, an image sensing device and an operation method of the same in accordance with embodiments of the present invention may improve resolution by performing a smart binning operation. In the smart binning operation, a binning value is generated by performing an edge detection interpolation (EDI) binning based on edge information, an average value which represents the plurality of pixels that are down-scaled through 4-sum binning operation is generated, and the binning value and the average value are combined.

While the present invention illustrates and describes specific embodiments, it will be apparent to those skilled in the art in light of the present invention that various changes and modifications may be made without departing from the spirit and scope of the invention as defined in the following claims. The present invention encompasses all such changes and modifications to the extent they fall within the scope of the claims.

What is claimed is:

1. A smart binning circuit, comprising:
    an edge information generator suitable for generating edge information from pixel data outputted from a pixel array;
    a weight allocator suitable for allocating a weight based on the edge information;
    a binning component suitable for generating a binning value by performing an edge detection interpolation (EDI) binning on the edge information;
    a bayer binning component suitable for generating an average value representing pixels that are down-scaled through a 4-sum binning operation; and
    a combiner suitable for combining the binning value and the average value according to the allocated weight.

2. The smart binning circuit of claim 1, wherein the binning component includes:
    an interpolation block suitable for performing an interpolation to estimate a plane having a same color based on the edge information; and
    a binning block suitable for performing the EDI binning on the pixel data interpolated by the interpolation block.

3. The smart binning circuit of claim 2, wherein the interpolation block estimates a red color pixel and a blue color pixel as a green color pixel using a horizontal direction filter, a vertical direction filter or horizontal/vertical direction filter based on the edge information generated from the interpolation block.

4. The smart binning circuit of claim 3, wherein the interpolation block uses the horizontal filter when an edge direction of the plurality of pixels as indicated by the edge information is the horizontal direction, uses the vertical filter when the edge direction of the plurality of pixels is the vertical direction, and uses the horizontal/vertical direction filter when the edge direction of the plurality of pixels is a diagonal direction.

5. The smart binning circuit of claim 1, wherein the combiner allocates the weight to one of the binning value and the average value, combines the binning value and the average value, and outputs combined value.

6. The smart binning circuit of claim 5, wherein the combiner allocates the weight to the binning value when a strength of the edge information is greater than a set value, and allocates the weight to the average value when the strength of the edge information is less than the set value.

7. The smart binning circuit of claim 1, wherein the weight allocator calculates a lean value using the horizontal direction filter and the vertical direction filter, and a single weight per 2×2 pixel based on the lean value.

8. An image sensing device, comprising:
    an image sensor including a pixel array having a plurality of pixels;
    an image signal processor suitable for processing an output signal of the image sensor; and
    a smart binning circuit, wherein the smart binning circuit comprises:
- an edge information generator suitable for generating edge information from pixel data, which are outputted from a pixel array;
- a weight allocator suitable for allocating a weight based on the edge information;
- a binning component suitable for generating a binning value by performing an edge detection interpolation (EDI) binning on the edge information;
- a bayer binning component suitable for generating an average value representing pixels that are down-scaled through a 4-sum binning operation; and
- a combiner suitable for combining the binning value and the average value according to the allocated weight.

9. The image sensing device of claim 8, wherein the binning component includes:
- an interpolation block suitable for performing an interpolation to estimate a plane having a same color based on the edge information; and
- a binning block suitable for performing the EDI binning on the pixel data interpolated by the interpolation block.

10. The image sensing device of claim 9, wherein the interpolation block estimates a red color pixel and a blue color pixel as a green color pixel using a horizontal direction filter, a vertical direction filter and horizontal/vertical direction filter based on the edge information generated from the interpolation block.

11. The image sensing device of claim 8, wherein the combiner allocates differently the weight to the binning value and the average value, combines the binning value and the average value that the weight is differently allocated, and outputs combined value.

12. The image sensing device of claim 11, wherein the combiner allocates the weight to the binning value when a strength of the edge information is greater than a set value, and allocates the weight to the average value when the strength of the edge information is less than the set value.

13. The image sensing device of claim 8, wherein the weight allocator calculates a lean value using the horizontal direction filter and the vertical direction filter, and a single weight per 2×2 pixel based on the lean value.

14. An image sensing device, comprising:
- an image sensor including a pixel array having a plurality of pixels;
- an image signal processor suitable for processing an output signal of the image sensor; and
- a smart binning circuit,
- wherein the smart binning circuit comprises:
  - a smart binning component suitable for performing a first binning operation on edge information generated from pixel data outputted from a pixel array and outputting first pixel information;
  - a bayer binning component suitable for outputting second pixel information by performing a second binning operation on a bayer format data converted from the plurality of pixel data;
  - an illumination information generator suitable for generating illumination information indicating low illumination less than a preset value or high illumination greater than the preset value; and
  - a pixel information selector suitable for selectively outputting the first pixel information and the second pixel information according to the illumination information.

15. The image sensing device of claim 14, wherein the pixel information selector outputs the first pixel information when the illumination information indicates low illumination, and outputs the second pixel information when the illumination information indicates high illumination.

16. The image sensing device of claim 14, wherein the first binning operation includes an operation for performing an edge detection interpolation (EDI) binning operation on the edge information, and the second binning operation includes an operation for generating an average value representing pixels that are down-scaled through a 4-sum binning operation.

17. The image sensing device of claim 14, wherein the smart binning component comprises:
- an edge information generator suitable for generating the edge information from the plurality of pixel data, which are outputted from the pixel array;
- a weight allocator suitable for allocating the weight based on the edge information generated from the edge information generator;
- a binning component suitable for generating the binning value by performing the EDI binning operation on the edge information generated from the edge information generator;
- a bayer binning component suitable for generating an average value representing pixels that are down-scaled through a 4-sum binning operation; and
- a binning component suitable for generating the binning value by performing the EDI binning operation on the edge information according to the weight allocated by the weight allocator.

18. An operation method of an image sensing device, comprising:
- outputting first pixel information by performing a first binning operation according to edge information generated from pixel data, which are outputted from a pixel array;
- outputting second pixel information by performing a second binning operation on bayer format data converted from the plurality of pixel data;
- generating illumination information indicating high illumination information or low illumination with reference to a set value according to surrounding illumination condition; and
- selectively outputting the first pixel information and the second pixel information based on the illumination information.

19. The operation method of claim 18, wherein the first binning operation includes an operation for performing an edge detection interpolation (EDI) binning operation on the edge information, and the second binning operation includes an operation for generating an average value representing pixels that are down-scaled through a 4-sum binning operation, and
- wherein the first pixel information is outputted when the illumination information indicates low illumination, and the second pixel information is outputted when the illumination information indicates high illumination.

20. The operation method of claim 18, wherein the outputting of the first pixel information includes:
- generating the edge information from the plurality of pixel data;
- allocating the weight based on the edge information; and
- generating the binning value by performing the EDI binning operation on the edge information according to the weight.

21. An image sensing device comprising:
  an image sensor including a plurality of pixels and outputting pixel data; and
  a binning circuit comprises:
    an edge information generator suitable for generating edge information from the pixel data;
    an interpolation binning component suitable for generating first binning information by performing an edge detection interpolation (EDI) binning on the edge information;
    a bayer binning component suitable for generating second binning information by performing a set down-scale binning on the pixel data; and
    a combiner suitable for receiving the first and second binning information, allocating different weights to the first and second binning information based on strength of the edge information to generate third and fourth binning information, respectively, combining the third and fourth binning information and outputting the combined binning information.

* * * * *